United States Patent [19]
Boyd

[11] Patent Number: 6,035,585
[45] Date of Patent: Mar. 14, 2000

[54] APPARATUS AND METHOD FOR A PORTABLE, MODULAR, VEHICLE WASHING AND SERVICING STRUCTURE

[76] Inventor: Jon Taylor Boyd, 3516 Riverbrook, Dallas, Tex. 75230

[21] Appl. No.: 09/065,228

[22] Filed: Apr. 6, 1998

[51] Int. Cl.[7] ........................ E04H 1/02
[52] U.S. Cl. .................... 52/79.1; 52/79.5; 52/79.9; 52/79.12
[58] Field of Search .................. 52/79.1, 79.5, 52/79.6, 79.9, 79.12

[56] References Cited

U.S. PATENT DOCUMENTS

| | | | |
|---|---|---|---|
| 1,886,962 | 11/1932 | La Roche | 52/79.9 X |
| 2,691,291 | 10/1954 | Henderson | 52/79.9 |
| 3,201,907 | 8/1965 | Henderson | 52/79.5 X |
| 3,353,546 | 11/1967 | Mahoney . | |
| 3,822,569 | 7/1974 | Lautrup-Larsen | 52/79.1 X |
| 3,862,534 | 1/1975 | Coletti | 52/79.1 X |
| 4,010,579 | 3/1977 | Galvagni | 52/79.9 X |
| 4,075,814 | 2/1978 | Theurer et al. | 52/79.5 |
| 4,124,964 | 11/1978 | Juriss et al. | 52/79.9 X |
| 4,194,339 | 3/1980 | Fisher | 52/79.9 X |
| 4,880,026 | 11/1989 | Ferre et al. . | |
| 5,033,489 | 7/1991 | Ferre et al. . | |
| 5,072,554 | 12/1991 | Hayman | 52/79.9 X |
| 5,473,844 | 12/1995 | Martin . | |
| 5,575,119 | 11/1996 | Wolfowitz | 52/79.5 X |
| 5,613,331 | 3/1997 | LaGanke . | |

FOREIGN PATENT DOCUMENTS

| | | | |
|---|---|---|---|
| 2210342 | 9/1973 | Germany | 52/79.1 X |
| 302509 | 7/1968 | Sweden | 52/79.12 |

*Primary Examiner*—Beth Aubrey
*Assistant Examiner*—Brian E. Glessner
*Attorney, Agent, or Firm*—Baker & Botts, L.L.P.

[57] ABSTRACT

A portable, modular, vehicle washing and servicing structure 10 includes a prefabricated first unit 12, a prefabricated second unit 28 and a roof 46. First unit 12 includes two sidewalls 14 and 16 and two endwalls 18 and 20. Second unit 28 includes one sidewall 30 and two endwalls 32 and 34. Structure 10 also includes means 42 for attaching first unit 12 to second unit 28 so that sidewall 16 of first unit 12 also forms a sidewall for second unit 28.

18 Claims, 7 Drawing Sheets

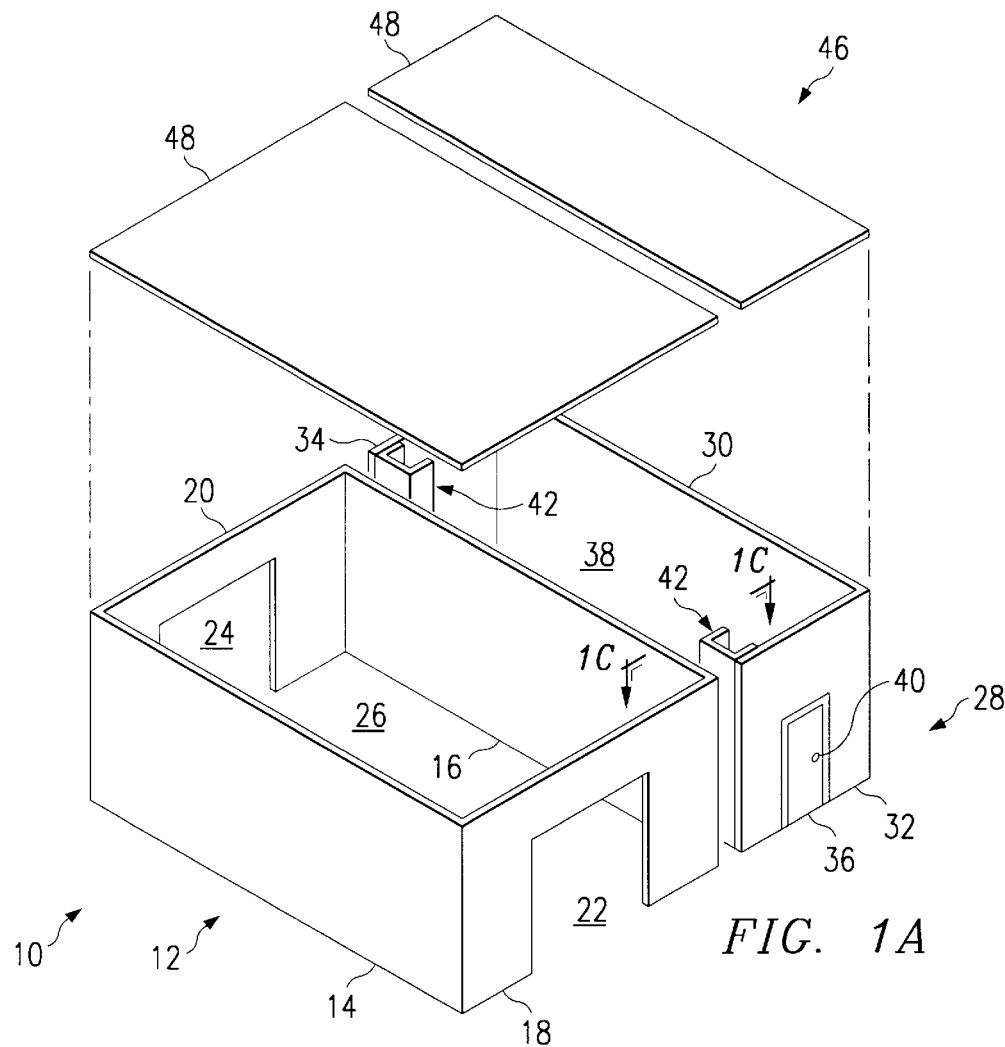
FIG. 1A
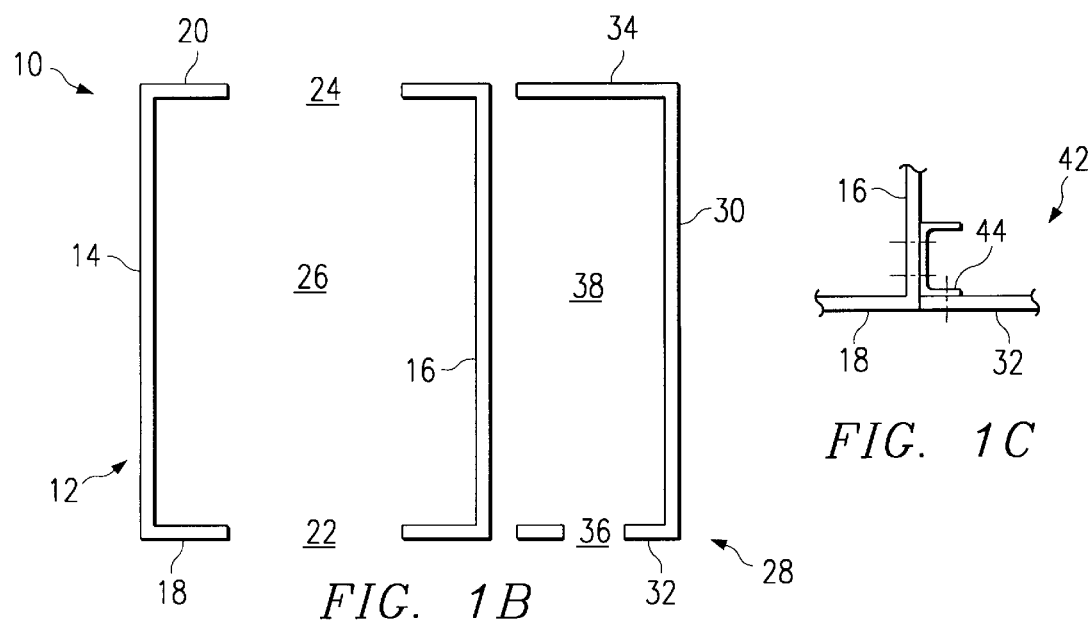
FIG. 1B
FIG. 1C

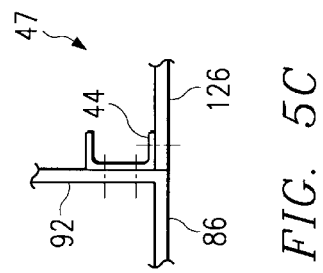
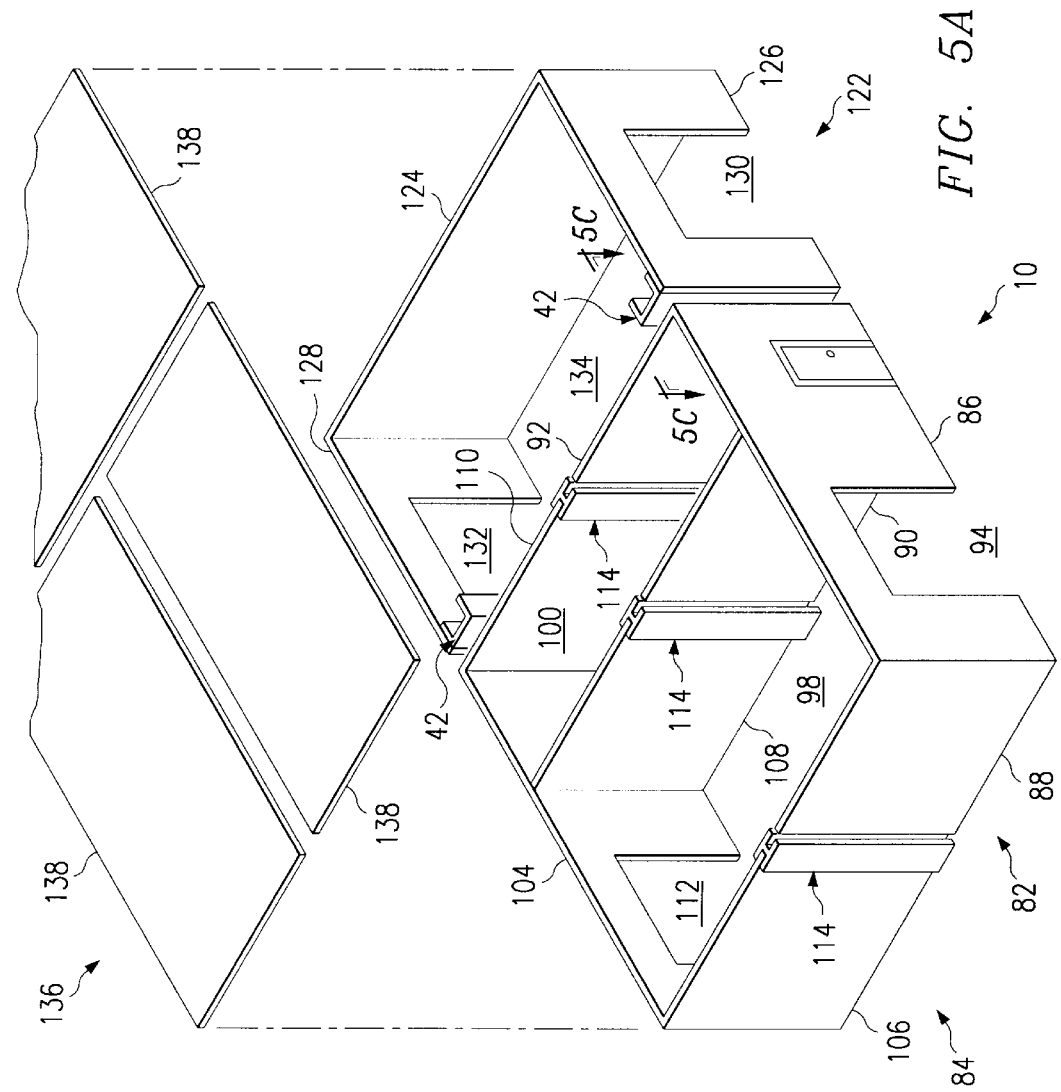

APPARATUS AND METHOD FOR A PORTABLE, MODULAR, VEHICLE WASHING AND SERVICING STRUCTURE

TECHNICAL FIELD OF THE INVENTION

This invention relates in general to the field of modular buildings and, more particularly, to an apparatus and method for a portable, modular, vehicle washing and servicing structure.

BACKGROUND OF THE INVENTION

Vehicle washing and servicing structures serve a variety of useful purposes, such as providing a location for washing and waxing a vehicle or providing consumers with a location and services for receiving a vehicle oil change. For example, a vehicle washing and servicing structure may include a coin operated manual washing system having a soap and water supply used with a simple brush and nozzle device, or may include oil changing and lubricating services to provide a vehicle owner with an oil change in ten minutes or less. Additionally, owning and maintaining a vehicle washing and servicing structure may be very profitable.

Current permanent vehicle washing and servicing structures, however, suffer several disadvantages. For example, economic viability of constructing and maintaining a permanent vehicle washing and servicing structure may depend on consumer demand at a particular location. However, determining economic viability may require expending large sums to construct and operate the vehicle washing and servicing structure over a period of time until a sales volume can be established. In addition, consumer demand may be so overwhelming that a larger vehicle washing and servicing structure could have been constructed and maintained profitably. However, structural changes to the vehicle washing and servicing structure may be costly and time-consuming.

SUMMARY OF THE INVENTION

Accordingly, a need has arisen for an apparatus and method for a portable, modular, vehicle washing and servicing structure.

In accordance with the teachings of the present invention, an apparatus and method for a portable, modular, vehicle washing and service structure are provided that address disadvantages and the problems associated with prior art vehicle washing and service structures. According to one embodiment of the present invention, a portable, modular, vehicle washing and servicing structure comprises a first unit having two sidewalls and two endwalls. One of the endwalls has an opening to provide access to an interior area of the vehicle washing and servicing structure. The vehicle washing and servicing structure also includes a second unit comprising a single sidewall and two endwalls. The vehicle washing and servicing structure includes a means for attaching the first unit to the second unit so that one of the sidewalls of the first unit forms an enclosing sidewall of the second unit, wherein each of the two endwalls of the second unit comprise a first end attached to he sidewall of the second unit, and wherein each of the two endwalls of the second unit comprise a second end adapted to be attached to the sidewall of the first unit that forms the enclosing sidewall of the second unit. The vehicle washing and servicing structure also includes a roof disposed over the first and second units.

According to another embodiment of the invention, a method for fabricating a portable, modular, vehicle washing and servicing structure comprises providing a first unit having a plurality of sidewalls. The method also includes securing a second unit having a single sidewall to the first unit so that one of the sidewalls of the first unit forms a sidewall of the second unit. The method also includes securing a roof to the first and second units.

Embodiments of the invention provide several technical advantages. For example, one embodiment of the invention provides a vehicle washing and servicing structure that requires less time and cost to modify than conventional vehicle washing and servicing structures. Also, an embodiment of the invention provides a vehicle washing and servicing structure that requires less time and cost to relocate than conventional vehicle washing and servicing structures. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 1A illustrates an isometric view of a vehicle washing and servicing structure incorporating the teachings of the present invention;

FIG. 1B illustrates a plan view of the structure of FIG. 1A;

FIG. 1C illustrates an enlarged view of the structure of FIG. 1A taken along the line 1C—1C of FIG. 1A;

FIG. 5A illustrates an isometric view of an alternate embodiment of a vehicle washing and servicing structure incorporating the teachings of the present invention;

FIG 5C illustrates an enlarged view of the structure of FIG. 5A taken along the line 5C—5C of FIG. 5A.

DETAILED DESCRIPTION OF THE INVENTION

Figure 2A:
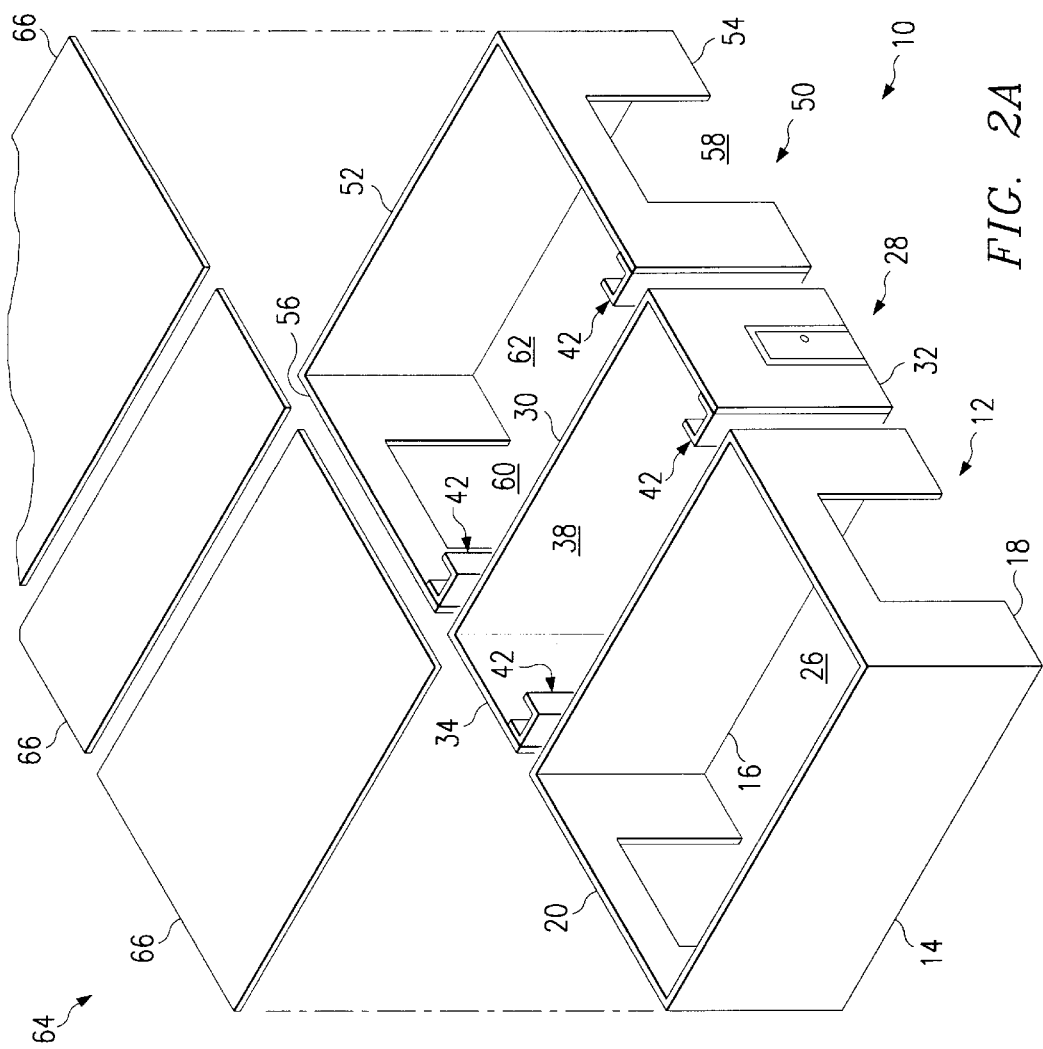
FIG. 2A illustrates an isometric view of an alternate embodiment of a vehicle washing and servicing structure incorporating the teachings of the present invention.

Embodiments of the present invention and its advantages are best understood by referring to FIGS. 1A through 6 of the drawings, like numbers being used for like and corresponding parts of the various drawings.

FIG. 1A illustrates an isometric view of a portable, modular, vehicle washing and servicing structure 10 incorporating the teachings of the present invention, and FIG. 1B illustrates a plan view of structure 10 shown in FIG. 1A. Structure 10 includes a prefabricated first unit 12 having two sidewalls 14 and 16 and two endwalls 18 and 20. Sidewalls 14 and 16 and endwalls 18 and 20 provide a protected environment for vehicle washing and servicing. Sidewalls 14 and 16 and endwalls 18 and 20 may also provide locations for mounting or storing vehicle washing and servicing equipment (not explicitly shown). Sidewalls 14 and 16 may be attached to endwalls 18 and 20 to form prefabricated first unit 12 using C-shaped or L-shaped channels (not explicitly shown) fastened to sidewalls 14 and 16 and endwalls 18 and 20; however other suitable materials and methods for attaching adjacent walls of structure may be used. A plurality of temporary braces (not explicitly shown) may be used to support sidewalls 14 and 16 and endwalls 18 and 20 of first unit 12 during transit of first unit 12 to a designated location where structure 10 may be assembled.

Endwalls 18 and 20 of first unit 12 include openings 22 and 24 providing access to an interior area 26 of first unit 12. Openings 22 and 24 may remain open allowing uninhibited access to interior area 26, or may include doors (not explicitly shown) restricting access to interior area 26. In operation, openings 20 and 22 allow a vehicle (not explicitly shown) to enter and exit interior area 26 of first unit 12 for washing and servicing.

Structure 10 also includes a prefabricated second unit 28 having a sidewall 30 and two endwalls 32 and 34. Sidewall 30 and endwalls 32 and 34 provide a protected environment for servicing or maintaining vehicle washing and servicing systems. Sidewall 30 and endwalls 32 and 34 may also provide locations to mount or store vehicle washing and servicing equipment or supplies (not explicitly shown). Sidewall 30 may be attached to endwalls 32 and 34 to form prefabricated second unit 28 using C-shaped or L-shaped channels (not explicitly shown) fastened to sidewall 30 and endwalls 32 and 34; however, other suitable materials and methods for attaching adjacent walls of structure may be used. A plurality of temporary braces (not explicitly shown) may also be used to support sidewall 30 and endwalls 32 and 34 of second unit 28 during transit of second unit 28 to a designated location where structure 10 may be assembled.

Endwall 32 of second unit 28 includes an opening 36 providing access to an interior area 38 of second unit 28. Opening 36 of endwall 32 may include a door 40 restricting access to interior area 38 of second unit 28, or may remain open providing uninhibited access to interior area 38 of second unit 28. As described in greater detail in conjunction with FIG. 1C, first unit 12 and second unit 28 provide for efficient assembly of structure 10 at a designated location.

FIG. 1C illustrates an enlarged view of structure 10 including a means 42 for attaching second unit 28 to first unit 12. Means 42 for attaching second unit 28 to first unit 12 may include a plurality of C-shaped channels 44 fastened to endwalls 32 and 34 of second unit 28 and sidewall 16 of first unit 12; however, means 42 may include other suitable methods and materials for attaching adjacent walls of a structure. As best shown in FIG. 1A, first unit 12 is attached to second unit 28 so that sidewall 16 of first unit 12 forms a sidewall for second unit 28.

Structure 10 also includes a roof 46 disposed over first unit 12 and second unit 28. Roof 46 may include a plurality of roof units 48 or may be constructed as a single unit. Roof 46 may be attached to first unit 12 and second unit 28 using C-shaped or L-shaped channels (not explicitly shown) fastened to roof 46 and walls of first unit 12 and second unit 28; however, other suitable materials and methods for attaching adjacent structure may be used.

The advantages of the present invention include the ability to locate and construct a vehicle washing and servicing structure in less time than conventional washing and service structures. For example, first unit 12, second unit 28 and roof 46 may be prefabricated well in advance of a need for a vehicle washing or servicing structure. When a need or opportunity arises for a vehicle washing or servicing structure, first unit 12, second unit 28 and roof 46 may be readily transported to a designated location where structure 10 may be assembled. In addition, structure 10 may be readily disassembled, and first unit 12, second unit 28 and roof 46 may be transported to a new location.

Figure 2B:
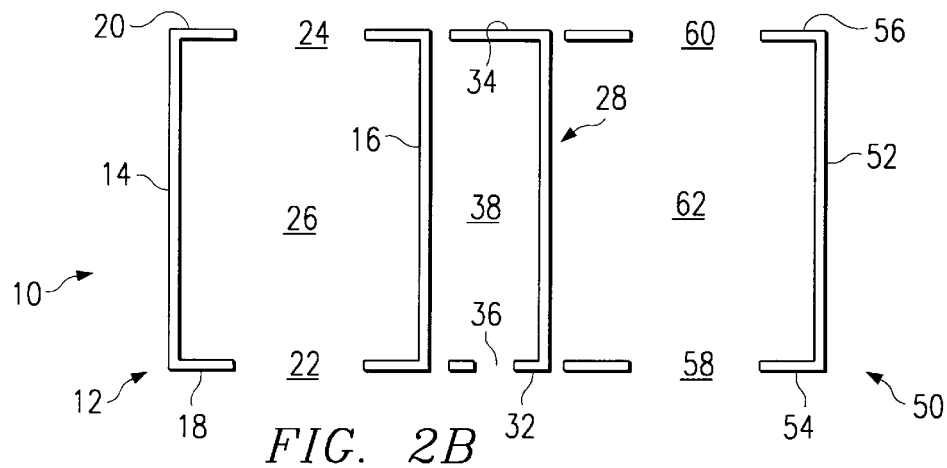
FIG. 2B illustrates a plan view of the structure of FIG. 2A.

FIG. 2A illustrates an isometric view of an alternate embodiment of structure 10 incorporating the teachings of the present invention, and FIG. 2B illustrates a plan view of structure 10 shown in FIG. 2A. In this embodiment, structure 10 includes first unit 12, second unit 28, and a prefabricated third unit 50. Third unit 50 includes a sidewall 52 and two endwalls 54 and 56. Similarly to first unit 12, sidewall 52 and endwalls 54 and 56 provide a protected environment for washing and servicing a vehicle. Sidewall 52 and endwalls 54 and 56 may also provide locations for mounting or storing vehicle washing and servicing equipment (not explicitly shown). Sidewall 52 may be attached to endwalls 54 and 56 to form prefabricated third unit 50 using C-shaped or L-shaped channels (not explicitly shown) fastened to sidewall 52 and endwalls 54 and 56; however, other suitable materials and methods for attaching adjacent walls of structure may be used. A plurality of temporary braces (not explicitly shown) may also be used to support sidewall 52 and endwalls 54 and 56 of third unit 50 during transit of third unit 50 to a designated location where structure 10 may be assembled.

Endwalls 54 and 56 of third unit 50 include openings 58 and 60 providing access to an interior area 62 of third unit 50. Openings 58 and 60 may remain open allowing uninhibited access to interior area 62, or may include doors restricting access to interior area 62. In operation, openings 58 and 60 allow a vehicle to enter and exit interior area 62 of third unit 50 for washing and servicing.

Means 42 for attaching first unit 12 to second unit 28, as previously described and shown in FIGS. 1A and 1C, may also be used for attaching third unit 50 to second unit 28. For example, channel 44 may be fastened to endwall 54 of third unit 50 and sidewall 30 of second unit 28, and channel 44 may be fastened to endwall 56 of third unit 50 and sidewall 30 of second unit 28. Thus, third unit 50 is attached to second unit 28 so that sidewall 30 of second unit 28 forms a sidewall of third unit 50.

A roof 64 is disposed over first unit 12, second unit 28, and third unit 50 providing environmental protection for interior areas 26, 38 and 62 of structure 10. Roof 64 may include a plurality of roof units 66 or may be constructed as a single unit. Roof 64 may be attached to first unit 12, second unit 28, and third unit 50 using C-shaped or L-shaped channels (not explicitly shown) fastened to roof 64 and walls of first unit 12, second unit 28, and third unit 50; however, other suitable materials and methods for attaching adjacent structure may be used. For example, C-shaped channels similar to channel 44, as shown in FIGS. 1A and 1C, may be fastened to roof 64 and walls of first unit 12, second unit 28, and third unit 50.

Thus, according to the embodiment described above, structure 10 provides for a variety of vehicle washing and servicing structure designs. Further, additional units may be added to or removed from structure 10 at various times as vehicle washing and servicing needs vary. For example, structure 10 may originally include first unit 12, second unit 28 and roof 46 as shown in FIG. 1A. An increase in consumer use of structure 10 may make adding third unit 50 to structure 10 economically advantageous. Third unit 50 and roof unit 66 may be transported to an existing structure 10 and readily assembled. Thus, structure 10 provides for greater flexibility than conventional washing and servicing structures.

Figure 3B:
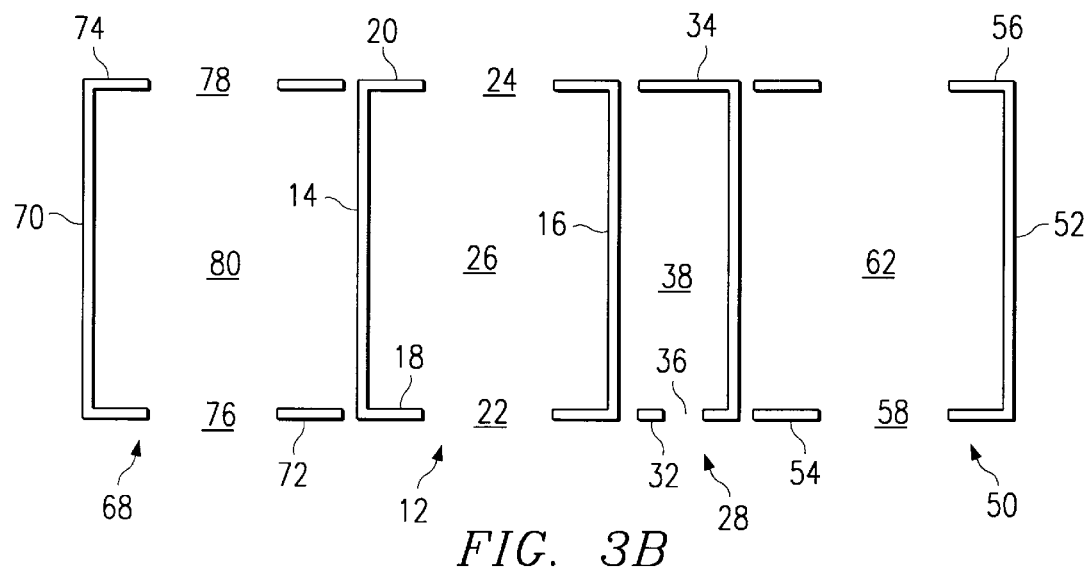
FIG. 3B illustrates a plan view of the structure of FIG. 3A.
Figure 3A:
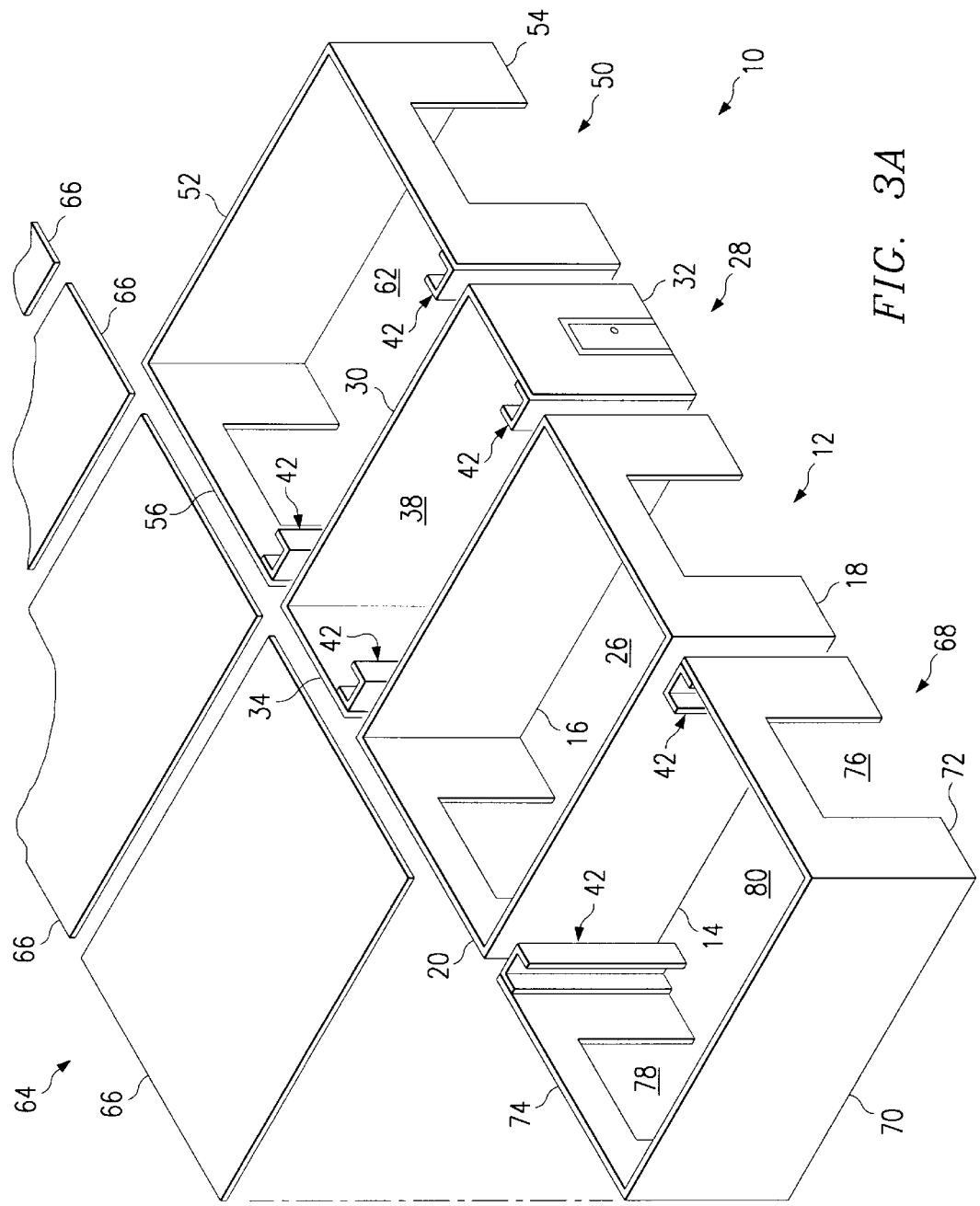
FIG. 3A illustrates an isometric view of an alternate embodiment of a vehicle washing and servicing structure incorporating the teachings of the present invention.

FIG. 3A illustrates an alternate embodiment of the present invention including a prefabricated fourth unit 68, and FIG. 3B illustrates a plan view of structure 10 shown in FIG. 3A. Fourth unit 68 includes a sidewall 70 and two endwalls 72 and 74. Sidewall 70 and endwalls 72 and 74 provide a protected environment for vehicle washing and servicing. Sidewall 70 and endwalls 72 and 74 may also provide locations for mounting or storing vehicle washing and servicing equipment and supplies (not explicitly shown). Sidewall 70 may be attached to endwalls 72 and 74 to form prefabricated fourth unit 68 using C-shaped or L-shaped channels (not explicitly shown) fastened to sidewall 70 and endwalls 72 and 74; however, other suitable materials and methods for attaching adjacent walls of structure may be used. A plurality of temporary braces (not explicitly shown) may also be used to support sidewall 70 and endwalls 72 and 74 of fourth unit 68 during transit of fourth unit 68 to a designated location where structure 10 may be assembled.

Endwalls 72 and 74 of fourth unit 68 include openings 76 and 78 providing access to an interior area 80 of fourth unit 68. Openings 76 and 78 may remain open allowing uninhibited access to interior area 80 of fourth unit 68, or may include doors (not explicitly shown) restricting access to interior area 80 of fourth unit 68. In operation, openings 76 and 78 allow a vehicle to enter and exit interior area 80 of fourth unit 68 for washing and servicing.

Means 42 for attaching first unit 12 to second unit 28, as previously described and shown in FIGS. 1A and 1C, may also be used for attaching fourth unit 68 to first unit 12. Thus, sidewall 14 of first unit 12 forms a sidewall for fourth unit 68. Roof 64 is disposed over first unit 12, second unit 28, third unit 50 and fourth unit 68 providing environmental protection during washing and servicing of vehicles in structure 10. As previously discussed, roof 64 may include plurality of roof units 66 or may be constructed as a single unit. Additionally, roof 64 may be attached to first unit 12, second unit 28, third unit 50 and fourth unit 68 using C-shaped or L-shaped channels (not explicitly shown) fastened to roof 64 and walls of first unit 12, second unit 28, third unit 50 and fourth unit 68; however, other suitable materials and methods for attaching adjacent structure may be used.

Accordingly, the embodiment described above provides for a practically unlimited number of structure 10 designs constructed from a limited number of portable, modular units. For example, fourth unit 68 and third unit 50 may be designed so that fourth unit 68 and third unit 50 are interchangeable. Thus, either third unit 50 or fourth unit 68 may be attached to second unit 28 so that sidewall 30 of second unit 28 forms a sidewall for either third unit 50 or fourth unit 68. Similarly, either third unit 50 or fourth unit 68 may be attached to first unit 12 so that sidewall 14 of first unit 12 forms a sidewall for either third unit 50 or fourth unit 68. Further, additional third units 50 or fourth units 68 may be attached to either end of structure 10 as space or property limits permit. Accordingly, structure 10 provides greater flexibility than conventional vehicle washing and servicing structures.

Figure 4A:
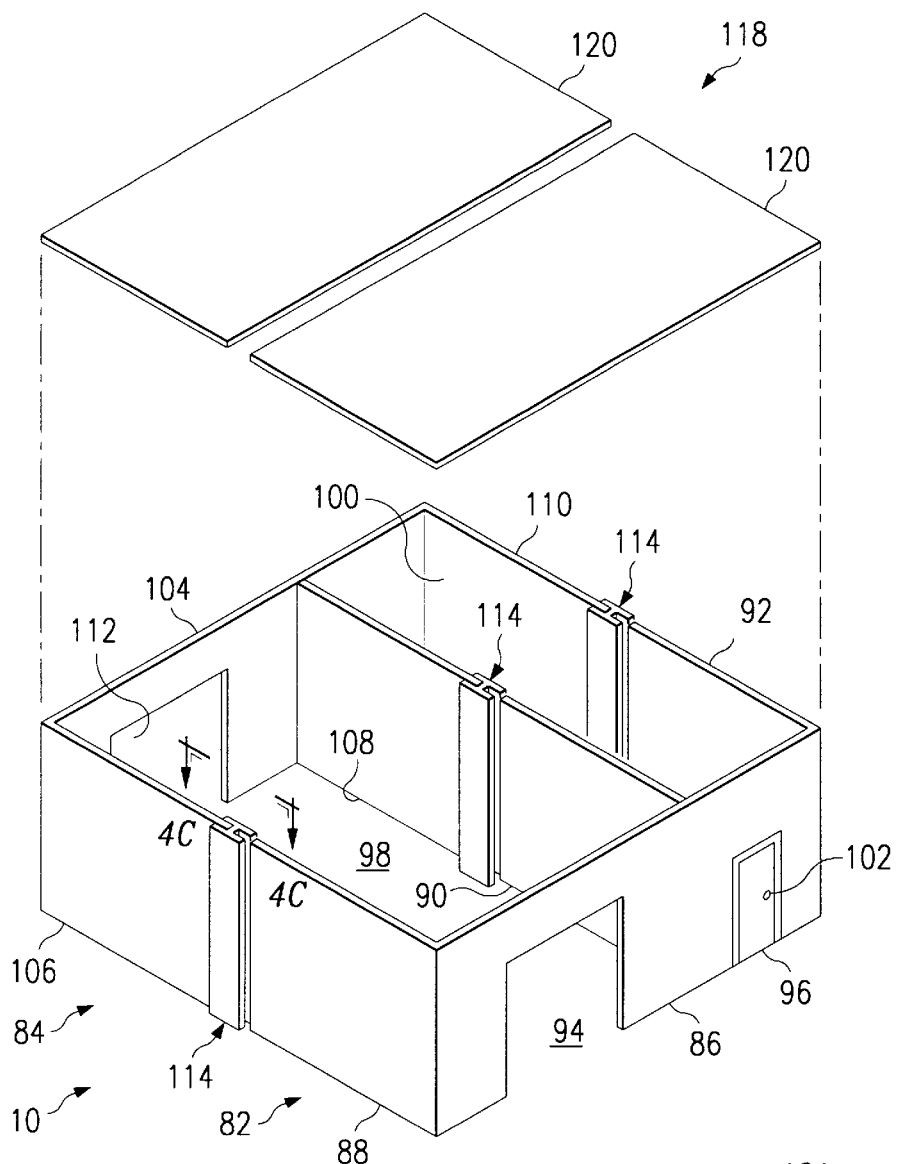
FIG. 4A illustrates an isometric view of an alternate embodiment of a vehicle washing and servicing structure incorporating the teachings of the present invention.
Figure 4C:
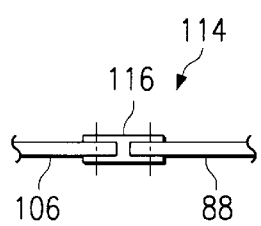
FIG. 4C illustrates an enlarged view of the structure of FIG. 4A taken along the line 4C—4C of FIG. 4A.
Figure 4B:
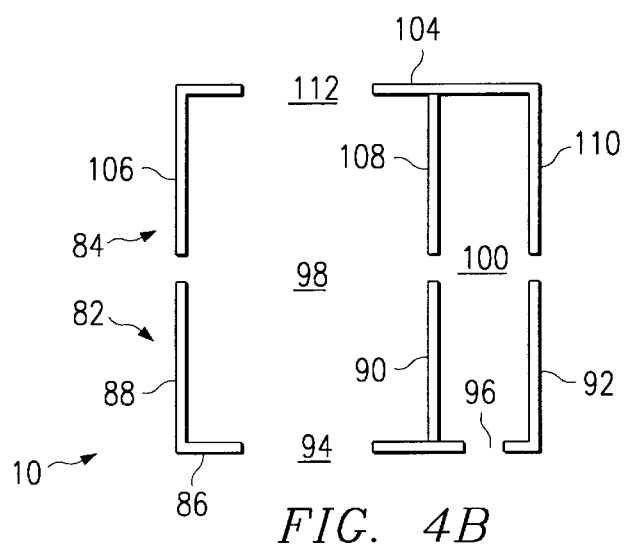
FIG. 4B illustrates a plan view of the structure of FIG. 4A.

FIG. 4A illustrates an alternate embodiment of the present invention where structure 10 includes a prefabricated anterior unit 82 and a prefabricated posterior unit 84, and FIG. 4B illustrates a plan view of structure 10 illustrated in FIG. 4A. Anterior unit 82 includes a front endwall 86 and connecting sidewalls 88, 90 and 92. Front endwall 86 may be attached to connecting sidewalls 88, 90 and 92 to form prefabricated anterior unit 82 using C-shaped or L-shaped channels (not explicitly shown) fastened to front endwall 86 and connecting sidewalls 88, 90 and 92; however, other suitable materials and methods for attaching adjacent walls of structure may be used. A plurality of temporary braces (not explicitly shown) may also be used to support front endwall 86 connecting sidewalls 88, 90 and 92 of anterior unit 82 during transit of anterior unit 82 to a designated location where structure 10 may be assembled.

Front endwall 86 of anterior unit 82 also includes openings 94 and 96 providing access to interior areas 98 and 100 of structure 10. Opening 94 of front endwall 86 may remain open allowing uninhibited access to interior area 98, or may include a door (not explicitly shown) restricting access to interior area 98. Similarly, opening 96 may include a door 102 restricting access to interior area 100, or may remain open allowing uninhibited access to interior area 100.

Posterior unit 84 includes a rear endwall 104 and connecting sidewalls 106, 108 and 110. Rear endwall 104 may be attached to connecting sidewalls 106, 108 and 110 to form prefabricated posterior unit 84 using C-shaped or L-shaped channels (not explicitly shown) fastened to rear endwall 104 and connecting sidewalls 106, 108 and 110; however, other suitable materials and methods for attaching adjacent walls of structure may be used. A plurality of temporary braces (not explicitly shown) may also be used to support rear endwall 104 and connecting sidewalls 106, 108 and 110 of posterior unit 84 during transit of posterior unit 84 to a designated location where structure 10 may be assembled.

Rear endwall 104 also includes an opening 112 providing access to interior area 98 of structure 10. Opening 112 of rear endwall 104 may remain open allowing uninhibited access to interior area 98 of structure 10, or may include a door (not explicitly shown) restricting access to interior area 98 of structure 10. In operation, openings 94 and 112 allow a vehicle to enter and exit interior areas 98 and 100 of structure 10 for washing and servicing.

FIG. 4C illustrates an enlarged view of the embodiment described above taken along the line 4C—4C of FIG. 4A including means 114 for attaching posterior unit 84 to anterior unit 82. Means 114 may include a plurality of I-shaped channels 116 fastened to connecting sidewalls 106, 108 and 110 of posterior unit 84 and connecting sidewalls 88, 90 and 92 of anterior unit 82, respectively; however, means 114 may include other suitable materials or methods for attaching adjacent walls of structure.

A roof 118 is disposed over anterior unit 82 and posterior unit 84 providing environmental protection for interior areas 98 and 100 of structure 10. Roof 118 may include a plurality of roof units 120 or may be constructed as a single unit. Additionally, roof 118 may be attached to anterior unit 82 and posterior unit 84 using C-shaped or L-shaped channels (not explicitly shown) fastened to roof 118 and walls of anterior unit 82 and posterior unit 84; however, other suitable materials and methods for attaching adjacent structure may be used. For example, C-shaped channels similar to channel 44, as shown in FIGS. 1A and 1C, may fastened to roof 118 and walls of anterior unit 82 and posterior unit 84.

The advantages of this alternate embodiment of the present invention include the ability to increase or decrease an overall length of structure 10 as measured from front endwall 86 of anterior unit 82 to rear endwall 104 of posterior unit 84. For example, several different embodiments of anterior unit 82 may be constructed, each embodiment having a different length as measured from front endwall 86 towards rear endwall 104 by increasing or decreasing the length of connecting sidewalls 88, 90 and 92. Thus, the overall length of structure 10 measured from front endwall 86 to rear endwall 104 may vary depending on the length chosen for connecting sidewalls 88, 90, and 92. Therefore, structure 10 provides greater design flexibility than conventional vehicle washing and servicing structures.

Figure 5B:
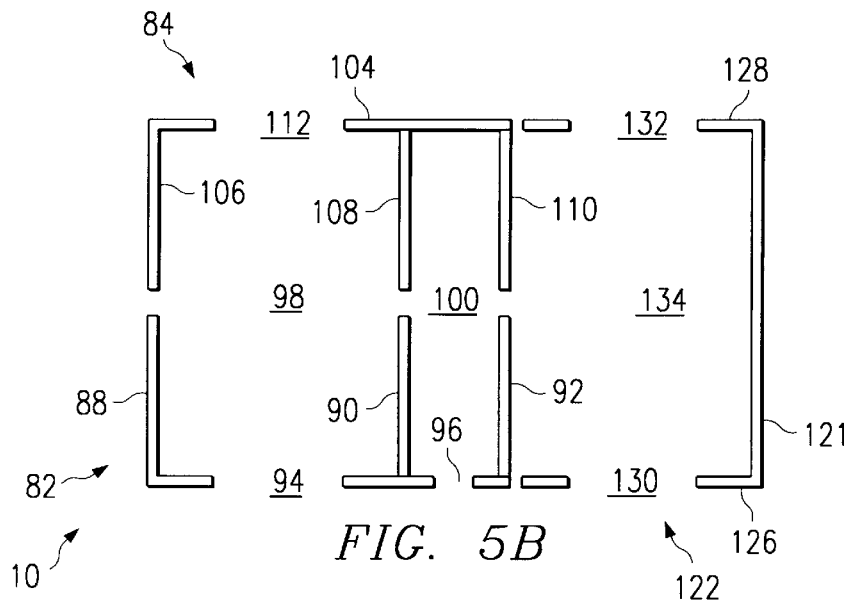
FIG. 5B illustrates a plan view of the structure of FIG. 5A.

FIG. 5A illustrates an alternate embodiment of the present invention including a prefabricated side unit 122 attached to anterior unit 82 and posterior unit 84, and FIG. 5B illustrates a plan view of structure 10 illustrated in FIG. 5A. Side unit 122 includes a sidewall 124 and two endwalls 126 and 128. Sidewall 124 and endwalls 126 and 128 provide a protected environment for vehicle washing and servicing. Sidewall 124 and endwalls 126 and 128 may also provide locations for mounting or storing vehicle washing and servicing equipment (not explicitly shown). Sidewall 124 may be attached to endwalls 126 and 128 to form prefabricated side unit 122 using C-shaped or L-shaped channels (not explicitly shown) fastened to sidewall 124 and endwalls 126 and 128; however, other suitable materials and methods for attaching adjacent walls of structure may be used. A plurality of temporary braces (not explicitly shown) may also be used to support sidewall 124 and endwalls 126 and 128 of side unit 122 during transit of side unit 122 to a designated location where structure 10 may be assembled.

Endwalls 126 and 128 of side unit 122 include openings 130 and 132 providing access to an interior area 134 of side unit 122. Openings 130 and 132 may remain open allowing uninhibited access to interior area 134 of side unit 122, or may include doors (not explicitly shown) restricting access to interior area 134 of side unit 122. In operation, openings 130 and 132 allow a vehicle to enter and exit interior area 134 of side unit 122 for washing and servicing.

FIG. 5C illustrates an enlarged view of the embodiment described above taken along the line 5C—5C of FIG. 5A including means 42 for attaching side unit 122 to anterior unit 82 and posterior unit 84. As previously discussed with reference to FIGS. 1A and 1C, means 42 for attaching first unit 12 to second unit 28 may also be used for attaching side unit 122 to anterior unit 82 and posterior unit 84. For example, a plurality of channels 44 may be fastened to endwall 126 of side unit 122 and connecting sidewall 92 of anterior unit 82, and fastened to endwall 128 of side unit 122 and connecting sidewall 110 of posterior unit 84; however, means 42 may include other suitable materials and methods for attaching adjacent walls of structure. Thus, side unit 122 is attached to anterior unit 82 and posterior unit 84 so that connecting sidewall 92 of anterior unit 82 and connecting sidewall 110 of posterior unit 84 form a sidewall for side unit 122.

A roof 136 is disposed over side unit 122, anterior unit 82 and posterior unit 84 providing environmental protection for interior areas 26, 38 and 134 of structure 10. Roof 136 may include a plurality of roof units 138, or may be constructed as a single unit. As previously discussed, roof 136 may be attached to side unit 122, anterior unit 82 and posterior unit 84 using C-shaped or L-shaped channels (not explicitly shown) fastened to roof 136 and walls of side unit 122, anterior unit 82 and posterior unit 84; however, other suitable materials and methods for attaching adjacent structure may be used.

The advantages of this alternate embodiment of the present invention include increased design flexibility of structure 10 by allowing additional prefabricated units to be either added to or removed from structure 10. For example, as previously discussed above, connecting sidewalls 88, 90 and 92 or connecting sidewalls 106, 108 and 110 may vary in length as measured from front endwall 86 of anterior unit 82 to rear endwall 104 of posterior unit 84 providing greater design flexibility of structure 10. Accordingly, side unit 122 may be constructed accommodating various overall lengths of structure 10 measured from front endwall 86 to rear endwall 104 by increasing or decreasing a length of sidewall 124 measured in the same direction.

Additionally, side unit 122 may be constructed providing for attachment to either end of anterior unit 82 and posterior unit 84. For example, side unit 122 may be attached to anterior unit 82 and posterior unit 84 so that connecting sidewall 88 of anterior unit 82 and connecting sidewall 106 of posterior unit 84 form a sidewall for side unit 122. Thus, a practically unlimited number of structure 10 designs may be achieved from a limited number of modular units. Therefore, structure 10 provides greater design flexibility than conventional vehicle washing and servicing structures.

Figure 6:
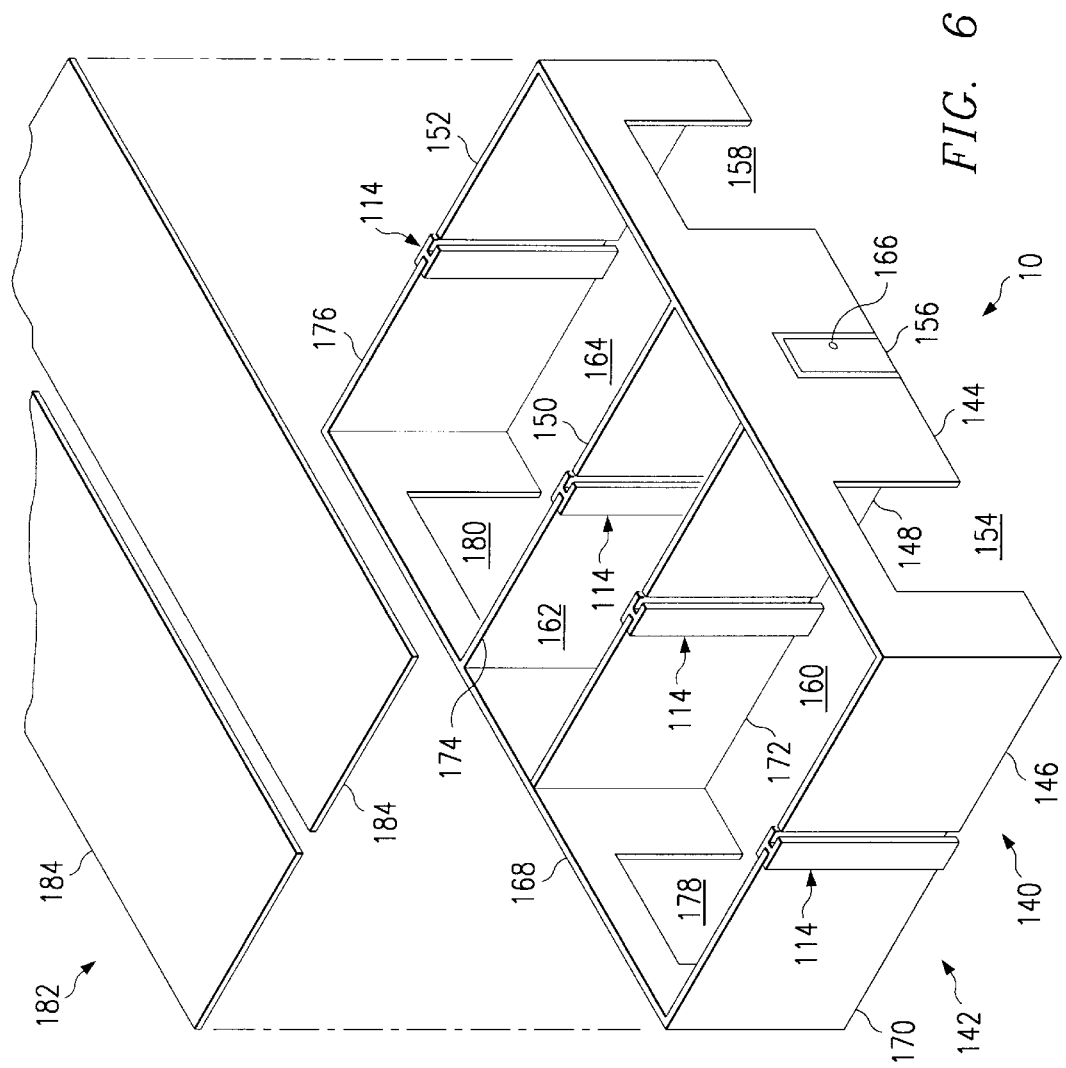
FIG 6 illustrates an isometric view of an alternate embodiment of a vehicle washing and servicing structure incorporating the teachings of the present invention.

FIG. 6 illustrates an alternate embodiment of the present invention including a prefabricated anterior unit 140 and a prefabricated posterior unit 142. Anterior unit 140 includes a front endwall 144 and connecting sidewalls 146, 148, 150 and 152. Front endwall 144 may be attached to connecting sidewalls 146, 148, 150 and 152 to form prefabricated anterior unit 140 using C-shaped or L-shaped channels (not explicitly shown) fastened to front endwall 144 and connecting sidewalls 146, 148, 150 and 152; however, other suitable materials and methods for attaching adjacent walls of structure may be used. A plurality of temporary braces (not explicitly shown) may also be used to support front endwall 144 and connecting sidewalls 146, 148, 150 and 152 of anterior unit 140 during transit of anterior unit 140 to a designated location where structure 10 may be assembled.

Front endwall 144 includes openings 154, 156 and 158 providing access to interior areas 160, 162 and 164 of structure 10. Openings 154 and 158 of front endwall 144 may remain open allowing uninhibited access to interior areas 160 and 164, or may include doors (not explicitly shown) restricting access to interior areas 160 and 164. Similarly, opening 156 may include a door 166 restricting access to interior area 162, or may remain open allowing uninhibited access to interior area 162.

Posterior unit 142 includes a rear endwall 168 and connecting sidewalls 170, 172, 174 and 176. Rear endwall 168 may be attached to connecting sidewalls 170, 172, 174 and 176 to form prefabricated posterior unit 142 using C-shaped or L-shaped channels (not explicitly shown) fastened to rear endwall 168 and connecting sidewalls 170, 172, 174 and 176; however, other suitable materials and methods for attaching adjacent walls of structure may be used. A plurality of temporary braces (not explicitly shown) may also be used to support rear endwall 168 and connecting sidewalls 170, 172, 174 and 176 of posterior unit 142 during transit of posterior unit 142 to a designated location where structure 10 may be assembled.

Rear endwall 168 includes openings 178 and 180 providing access to interior areas 160 and 164 of structure 10. Openings 178 and 180 of rear endwall 168 may remain open allowing uninhibited access to interior areas 160 and 164 of structure 10, or may include doors (not explicitly shown) restricting access to interior areas 160 and 164 of structure 10. In operation, openings 154, 158, 178 and 180 allow a vehicle to enter and exit interior areas 160 and 164 of structure 10 for washing and servicing.

Means 114 for attaching anterior unit 82 to posterior unit 84, as previously described and shown in FIGS. 4A and 4C, may also be used for attaching anterior unit 140 to posterior unit 142. Thus, means 114 may be used for attaching connecting sidewalls 146, 148, 150 and 152 to connecting sidewalls 170, 172, 174 and 176, respectively. As previously discussed, means 114 may include a plurality of I-shaped channels 116, or may include other suitable materials or methods for attaching adjacent walls of structure.

A roof 182 is disposed over anterior unit 140 and posterior unit 142 providing environmental protection for interior areas 160, 162 and 164 of structure 10. Roof 182 may include a plurality of roof units 184 or may be constructed as a single unit. As previously discussed, roof 182 may be attached to anterior unit 140 and posterior unit 142 using C-shaped or L-shaped channels (not explicitly shown) fastened to roof 182 and anterior unit 140 and posterior unit 142; however, other suitable materials and methods for attaching adjacent structure may be used.

The advantages of this alternate embodiment of the present invention include increased design flexibility of structure 10 by providing for a variety of vehicle washing and servicing structure designs. As previously discussed with reference to FIGS. 4A through 4C, the overall length of structure 10 as measured from front endwall 144 of anterior unit 140 to rear endwall 168 of posterior unit 142 may be increased or decreased by varying the length of connecting sidewalls 146, 148, 150 and 152 or connecting sidewalls 170, 172, 174 and 176.

Additionally, this alternate embodiment of the invention may be constructed to allow additional prefabricated units to be either added to or removed from structure 10. For example, as previously discussed with reference to FIG. 5A, structure 10 may be constructed providing for attachment of side unit 122 to either end of anterior unit 140 and posterior unit 142. Thus, structure 10 provides greater design flexibility than conventional vehicle washing and servicing structures.

Although the present invention and its advantages have been described in detail, it should be understood that various changes, substitutions, and alterations can be made therein without departing from the spirit and scope of the present invention as defined by the appended claims.

What is claimed is:

1. A portable, modular, vehicle washing and servicing structure comprising:

a first unit having two sidewalls and two endwalls, wherein one of the endwalls has an opening to provide access to an interior area of the structure, and wherein each of the two endwalls is adapted to be attached to each of the two sidewalls;

a second unit comprising a sidewall and two endwalls;

means for attaching the first unit to the second unit so that one of the sidewalls of the first unit forms an enclosing sidewall of the second unit; and a roof adapted to be disposed over the first and second units.

2. The structure of claim 1, wherein both endwalls of the first unit have openings to provide access to the interior area of the structure.

3. The structure of claim 1, wherein one of the endwalls of the second unit has an opening to provide access to the interior area of the structure.

4. The structure of claim 1, further comprising a third unit having a sidewall and two endwalls; and means for attaching the third unit to either the first or second unit so that one of the sidewalls of the first or second unit forms an enclosing sidewall of the third unit.

5. The structure of claim 4, wherein one of the endwalls of the third unit has an opening to provide access to the interior area of the structure.

6. The structure of claim 4, wherein the two endwalls of the third unit have openings to provide access to the interior area of the structure.

7. The structure of claim 1, wherein the roof comprises a plurality of roof units.

8. The structure of claim 4, wherein the enclosing sidewall of the third unit is disposed adapted to be between the two endwalls of the third unit.

9. The structure of claim 1, wherein each of the two endwalls of the second unit comprise a first end attached to the sidewall of the second unit, and wherein each of the two endwalls of the second unit comprise a second end adapted to be attached to the sidewall of the first unit that forms the enclosing sidewall of the second unit.

10. A method for fabricating a portable, modular, vehicle washing and servicing structure, the method comprising:

providing a first unit having a plurality of sidewalls and a plurality of endwalls, wherein each of the endwalls is adapted to be attached to each of the sidewalls;

securing a second unit having a sidewall to the first unit so that one of the sidewalls of the first unit forms an enclosing sidewall of the second unit; and securing a roof to the first and second units.

11. The method of claim 10, wherein the step of securing the roof comprises securing a plurality of roof units to the first and second units.

12. The method of claim 10, wherein one of the plurality of endwalls has an opening to provide access to an interior area of the structure.

13. The method of claim 10, further comprising providing the second unit having a plurality of endwalls, wherein one of the plurality of endwalls has an opening to provide access to an interior area of the structure.

14. The method of claim 10, further comprising securing a third unit having a sidewall to either the first or second unit so that one of the sidewalls of the first or second unit forms an enclosing sidewall of the third unit.

15. The method of claim 14, further comprising providing the third unit having a plurality of endwalls, wherein one of the plurality of endwalls has an opening to provide access to an interior area of the structure.

16. The method of claim 14, further comprising providing the third unit having a plurality of endwalls, wherein the plurality of endwalls have openings to provide access to an interior area of the structure.

17. The method of claim 14, wherein the enclosing sidewall of the third unit is disposed between the two endwalls of the third unit.

18. The method of claim 10, wherein securing the second unit comprises:

securing a first end of a first endwall of the second unit to the first unit, wherein a second end of the first endwall of the second unit is attached to the sidewall of the second unit; and securing a first end of a second endwall of the second unit to the first unit, wherein a second end of the second endwall of the second unit is attached to the sidewall of the second unit.

* * * * *